March 17, 1964     C. McCARTNEY     3,125,613

SMOKE ELIMINATOR

Filed Nov. 8, 1960     2 Sheets—Sheet 1

Charles McCartney
INVENTOR.

BY *Clarence A. O'Brien*
and *Harvey B. Jacobson*
                     Attorneys March 17, 1964  C. McCARTNEY  3,125,613
SMOKE ELIMINATOR Filed Nov. 8, 1960  2 Sheets-Sheet 2

Charles McCartney
INVENTOR.

United States Patent Office 3,125,613
Patented Mar. 17, 1964

3,125,613
SMOKE ELIMINATOR
Charles McCartney, 218 5th St., Dravosburg, Pa.
Filed Nov. 8, 1960, Ser. No. 68,097
3 Claims. (Cl. 261—17)

The present invention generally relates to a smoke eliminator and more particularly to such a device adapted for use in combination with a home heating furnace or other types of furnaces and the like.

One of the present day existing problems, especially in large cities, is the problem of air pollution. Air pollution is caused by many different sources, one of which is the discharge of smoke, gaseous materials and other impurities from a chimney. Discharged impurities from home heating plants and industrial plants cause a serious air pollution problem especially in heavily populated areas. Therefore, it is the primary object of the present invention to eliminate the discharge of air pollutants such as smoke and poisonous gases from chimneys by employing a novel apparatus for removing such impurities from the discharge products prior to discharge into the atmosphere and at the same time removing part of the heat normally carried by such pollutants and discharged into the atmosphere for rendering the furnace or other source of the products of combustion more effective in operation.

Another object of the present invention is to provide a device for eliminating smoke, poisonous gases or the like forming a part of the discharge from a furnace or the like by passing the discharge through water whereby water will combine with and remove the pollutants while discharging substantially clean heated air. The water will remove smoke, dirt, poisonous gases and other impurities and will also remove a portion of the heat thereby enabling the device to regulate and determine the properties of the final discharge of material into the atmosphere.

Still another object of the present invention is to provide an apparatus of the character described employing a novel arrangement of components including a blower for inducing a vacuum on the discharge side of the furnace and forcing the discharge products through the water bath and also serving to cool the products of combustion.

Still another object of the present invention is to provide a smoke eliminator which is simple in construction, easy to use, easy to install, efficient in operation and generally inexpensive to manufacture and maintain.

These together with other objects and advantages which will become subsequently apparent reside in the details of costruction and operation as more fully hereinafter described and claimed, reference being had to the accompanying drawings forming a part hereof, wherein like numerals refer to like parts throughout, and in which:

Figure 1:
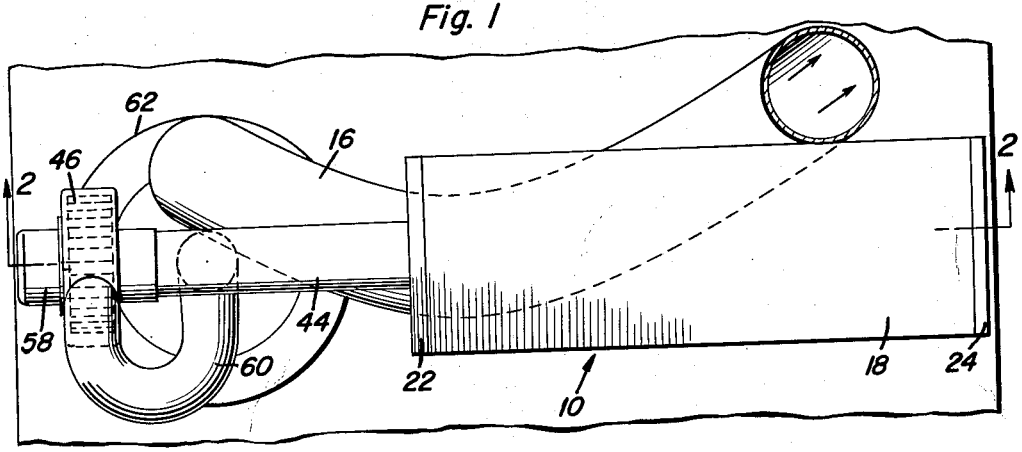
FIGURE 1 is a top plan view of the smoke eliminator of the present invention illustrating the structural details thereof.

Referring now specifically to the drawings, the numeral 10 generally designates the smoke eliminator of the present invention which may conveniently be mounted alongside of or on top of a furnace housing generally designated by numeral 12 and which is connected with the usual discharge stack or conduit 14 carrying combustion products from the furnace. Normally, the conduit 14 would be connected with a chimney for discharge of the products of combustion directly to the atmosphere. However, the structure of the present invention receives the combustion products and removes impurities such as smoke, dirt, poisonous gases or the like and then discharges the clean air to the atmosphere by virtue of a discharge tube 16 which may still extend into a chimney for discharging the cleaned products of the apparatus to the atmosphere.

The smoke eliminator 10 of the present invention includes a hollow tubular member 18 forming an enlarged air chamber 20. The tubular member 18 may be of any suitable configuration and is illustrated as being hollow and square. The tubular member 18 is provided with end plates 22 and 24 secured thereto in any suitable manner. Extending downwardly from one end of the tubular member 18 is an inlet pipe 26 which communicates with the conduit 14 and is provided with an automatic draft control designated generally by reference numeral 28 and including a butterfly valve 30 supported on offset pins 32 wherein the butterfly 30 will normally be closed by the force of gravity but will be opened due to the vacuum induced in the air chamber 20 thus assuring that the products of combustion will pass up through the conduit 14, through the L-shaped inlet pipe 26 and into the air chamber 20.

For diluting the products of combustion before they enter the air chamber 20, there is provided an air cooler generally designated by numeral 34 which includes a tubular cylindrical member 36 of generally the same cross-sectional area as the pipe 26. The cylindrical tubular member 36 is provided with a closed end 38 and an open end 40 for receiving air. Also, a plurality of holes or apertures 42 extend through the bottom of the cylindrical member 36 and into the pipe 26 whereby atmospheric air will be drawn into the inlet pipe 26 and intermingled with the combustion products thus effectively reducing the temperature of the combustion products and also diluting the combustion products.

Figure 3:
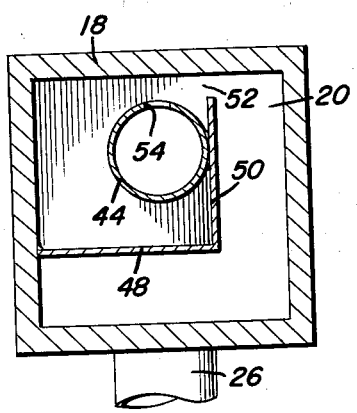
FIGURE 3 is a transverse, sectional view taken substantially upon a plane passing along section line 3—3 of FIGURE 2 illustrating the construction of the vacuum tube and baffle plate orientated in relation thereto.
Figure 5:
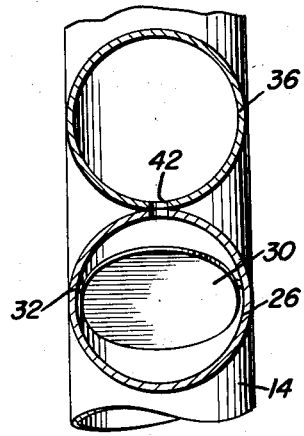
FIGURE 5 is a detailed sectional view taken substantially upon a plane passing along section line 5—5 of FIGURE 2 illustrating the draft control butterfly and the structure of the air cooler.
Figure 4:
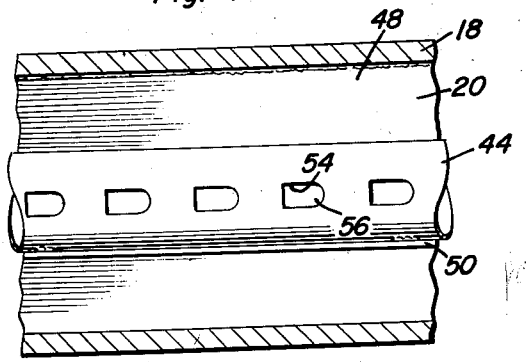
FIGURE 4 is a detailed sectional view taken substantially upon a plane passing along section line 4—4 of FIGURE 2 illustrating further structural details of the baffle plate and vacuum tube.

Disposed in the air chamber 20 is an elongated vacuum tube 44 having one end thereof butted against and welded to the end plate 24 and the other end extending longitudinally through the end plate 22 and communicated with the central intake of a blower 46 whereby the blower will induce a vacuum within the vacuum tube 44. The vacuum tube 44 is located adjacent the top of the tubular member 18 and an L-shaped baffle plate 48 is secured to the tubular member 18 with the horizontal leg thereof extending under the vacuum tube and a vertical leg 50 thereof extending upwardly alongside of and tangentially to the vacuum tube 44 substantially as illustrated in FIGURE 3. The upper edge of the vertical baffle plate 50 is spaced from the top wall of the tubular member 18 thus forming an entrance slot 52 for combustion products so that the combustion products which enter into the air chamber 20 from the inlet pipe 26 will spread longitudinally throughout the length of the air chamber 20 and then pass upwardly along the surface of the baffle plate 50 on the opposite side thereof from the vacuum tube 44 and then over the top edge of the baffle plate 50 and into the plurality of apertures 54 formed in the top surface of the vacuum tube 44. The apertures 54 are in the form of elongated slots with the slots being formed by downwardly struck tongs 56 facing the blower 46 whereby the air passing into the vacuum tube 44 will be deflected toward the blower 46.

Figure 2:
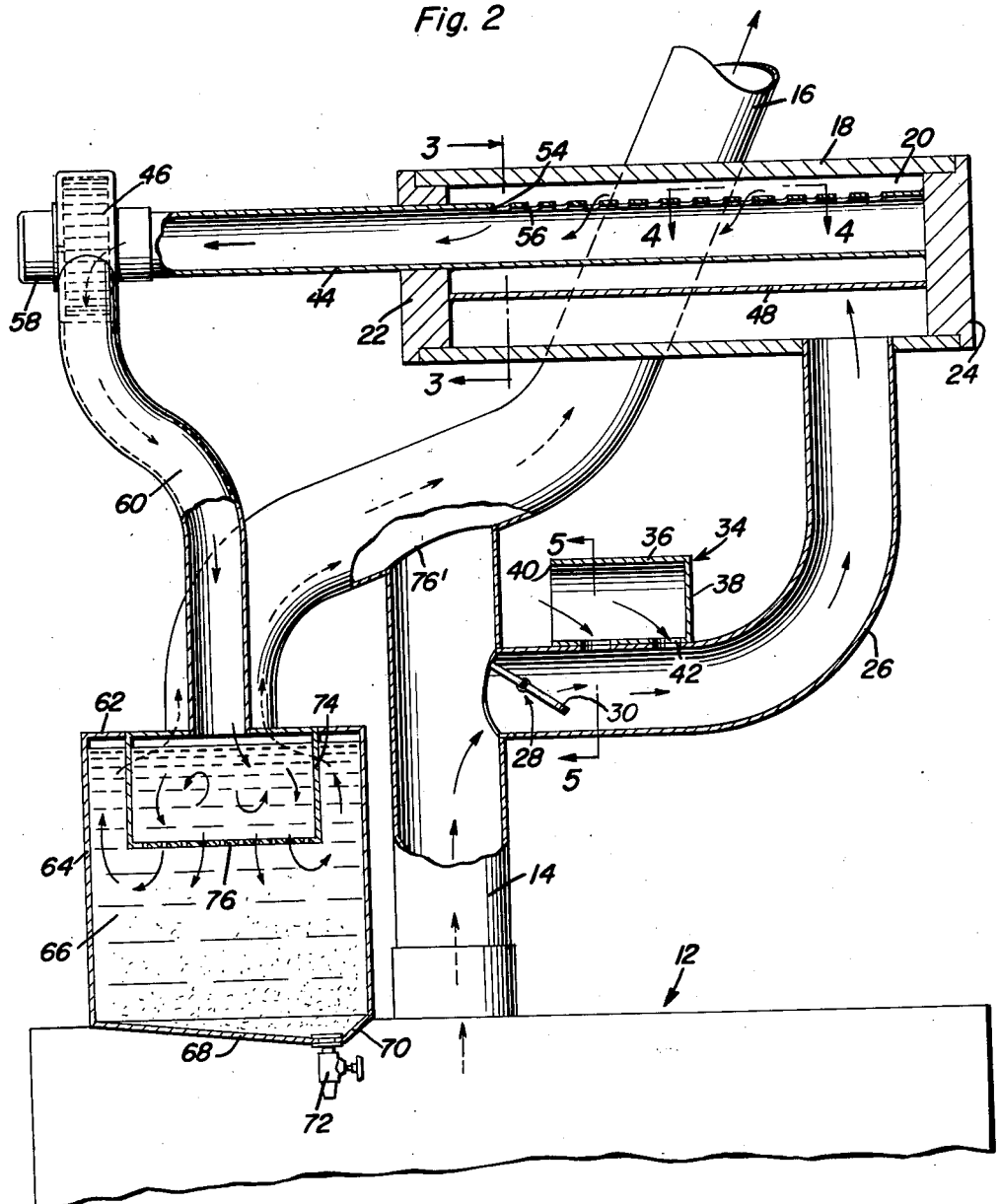
FIGURE 2 is a vertical sectional view taken substantially upon a plane passing along section line 2—2 of FIGURE 1 illustrating the orientation of components of the invention.

The blower 46 is operated by a suitable electric motor 58 and may be of any suitable type such as a squirrel cage blower and the blower 46 is provided with a discharge conduit 60 extending downwardly therefrom and entering into the top wall 62 of an enlarged receptacle 64 filled or substantially filled with water 66. The bottom of the receptacle 64 is designated by numeral 68 and is provided with a downwardly extending sump 70 having a valved discharge pipe 72 connected thereto for removing the heavier particles of material taken out of the combustion products by the water 66. Disposed interiorly of the receptacle 64 and in spaced relation to the walls thereof is an inner receptacle 74 with which the discharge pipe 60 communicates. The bottom of the inner receptacle 74 is in the form of a perforated screen 76 whereby the products of combustion discharge by the blower 46 will pass into the inner receptacle 74 and expand and then be forced down through the screen or apertured bottom surface 76 and out through the water 66. The products of combustion then are cleaned by the water 66 and the water will remove all dirt, smoke, poisonous gases and other impurities. The combustion products move toward the top wall 62 of the receptacle 64 and out through the enlarged discharge pipe 16 which is connected with the top wall 62 and communicates with the top of the receptacle 64 whereby the cleaned combustion products will pass up through the enlarged discharge conduit 16. As illustrated in FIGURE 2, the conduit or duct 14 is also connected with the discharge duct 16 at 76' which enables a normal convection draft to carry the products of combustion to the chimney in the event the smoke eliminator of the present invention is inoperative. Thus, this arrangement of ducts 14 and 16 provides an automatic safety vent for the combustion products. The smoke eliminator of the present invention is such that it will not effect the draft or heating properties of the furnace but will generally increase the efficiency of the furnace. The construction of the vacuum tube and air chamber is such that the vacuum tube will carry away all smoke, fumes and gases which may collect in the air chamber. The capacity of the tube and the blower is such that at no time does the amount of smoke and gas in the air chamber exceed the capacity of the vacuum tube to carry it away, thereby assuring that the air chamber is not full of combustion products at anytime when the machine or apparatus is in operation. When the discharge from the blower enters the separator tank, the impact of the air on the water causes the water to churn and agitate in such a way that all impurities generated by the furnace are separated from the air and settle to the bottom of the water tank so that the purified air may rise again and pass through the chimney or stack and into the surrounding atmosphere. The separator or inner tank is disposed on top of the water tank so that the water passes freely from the water tank into the separator tank thus assuring that the products of combustion will pass through clean water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A smoke eliminator for a furnace having an exhaust stack comprising means forming an air chamber, means connected to said air chamber for communicating the air chamber with the exhaust stack of the furnace, a vacuum tube including a plurality of air inlet openings disposed in the air chamber, a blower having an inlet connected by means of a duct with the vacuum tube, a water tank, means connecting the discharge of the blower with the water tank, compartment means disposed in the water tank and connected to said connecting means to receive combustion products from said blower, said compartment means having a perforated outlet means disposed below the water level in the water tank for discharging combustion products into the tank through the water, and an exhaust duct communicated with the top of the water tank for discharging cleaned air from the water tank to the atmosphere, the exhaust stack of the furnace being also directly connected by means of a duct with the exhaust duct extending from the top of the water tank to the atmosphere at a point downstream from the water tank and spaced above said means communicating the air chamber with the exhaust stack for assuring discharge of combustion products even though the smoke eliminator is inoperative, an automatic draft control means for automatically closing said means communicating the air chamber with the exhaust stack when the blower is rendered inoperative thereby forcing furnace exhaust through the exhaust stack and exhaust duct to the atmosphere in lieu of through the smoke eliminator, and means on said communicating means for admitting atmospheric air continuously for cooling and diluting the combustion products.

2. The structure as defined in claim 1 wherein said communicating means is connected to the lower portion of said air chamber and said vacuum tube extends longitudinally throughout the length of the air chamber, the openings in the vacuum tube being disposed on the top surface thereof interiorly of the air chamber and spaced from the top of the air chamber, an L-shaped baffle plate extending under the vacuum tube and upwardly alongside thereof and terminating in spaced relation to the top of the air chamber thereby deflecting the combustion products around to the top of the vacuum tube.

3. The structure as defined in claim 2 wherein said compartment means is provided with a perforated bottom disposed below the water level in the water tank thereby assuring that combustion products discharged into the water will agitate the water and pass through the water when passing out of the compartment means.

References Cited in the file of this patent

UNITED STATES PATENTS

| | | |
|---|---|---|
| 489,715 | Parkin et al. | Jan. 10, 1893 |
| 575,370 | Parks | Jan. 19, 1897 |
| 581,448 | White | Apr. 27, 1897 |
| 2,150,614 | Sutkowski | Mar. 14, 1939 |
| 2,617,371 | Resek et al. | Nov. 11, 1952 |
| 2,830,673 | Bungas | Apr. 15, 1958 |

FOREIGN PATENTS

| | | |
|---|---|---|
| 898,436 | France | July 2, 1944 |